ium Phenylazo Cationic Dyestuffs Containing an Unsaturable Group on the Quaternary Nitrogen

United States Patent

Krückenberg

[11] 3,876,627
[45] Apr. 8, 1975

[54] QUATERNARY AMMONIUM PHENYLAZO CATIONIC DYESTUFFS CONTAINING AN UNSATURABLE GROUP ON THE QUATERNARY NITROGEN

[75] Inventor: Winfried Kruckenberg, Leverkusen, Germany

[73] Assignee: Bayer Aktiengesellschaft, Leverkusen, Germany

[22] Filed: July 14, 1972

[21] Appl. No.: 271,673

[30] Foreign Application Priority Data
July 14, 1971   Germany............................ 2135152

[52] U.S. Cl. .................. 260/205; 8/13; 8/41 A; 8/41 B; 8/41 C; 106/22; 260/146 R; 260/147; 260/148; 260/149; 260/152; 260/155; 260/156; 260/162; 260/163; 260/165; 260/174; 260/185; 260/186; 260/187; 260/191; 260/196; 260/206; 260/207.1; 260/207.5
[51] Int. Cl. ............................................ C09b 29/06
[58] Field of Search................ 260/205, 186, 207.5

[56] References Cited
UNITED STATES PATENTS

| | | | |
|---|---|---|---|
| 2,206,099 | 7/1940 | McNally et al. ..................... | 260/205 |
| 2,821,526 | 1/1958 | Boyd Jr............................. | 260/205 |
| 2,955,108 | 10/1960 | Omictawski ........................ | 260/205 |
| 3,020,272 | 2/1962 | Sartori.............................. | 260/205 |
| 3,532,683 | 10/1970 | Sartori.............................. | 260/186 |
| 3,542,758 | 11/1970 | Hegar .............................. | 260/205 |
| 3,627,751 | 12/1971 | Hegar et al. ........................ | 260/205 |
| 3,663,529 | 5/1972 | Kubba et al. ....................... | 260/205 |
| 3,679,657 | 7/1972 | Desai et al......................... | 260/205 |

Primary Examiner—Henry R. Jiles
Assistant Examiner—Robert W. Ramsuer
Attorney, Agent, or Firm—Plumley & Tyner

[57] ABSTRACT

Azodyestuffs of the formula

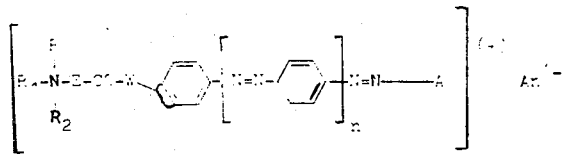

wherein
Z denotes an alkylene or aralkylene radical,
W denotes a direct bond or a bridge member,
R denotes an unsaturated alkyl radical which contains at least one double and/or triple bond,
$R_1$ denotes hydrogen, an alkyl radical or an unsaturated alkyl radical which contains at least one double or triple bond,
$R_2$ denotes hydrogen or an alkyl, amino, alkylamino or dialkylamino radical,
$R_1$ together with Z and the nitrogen atom denotes a heterocyclic structure,
$R_1$ together with $R_2$, Z and the nitrogen atom denotes a heterocyclic structure,
A denotes the radical of a carbocyclic or heterocyclic coupling component,
n denotes the numbers 0 or 1 and
$An^{(-)}$ denotes an anion, are suitable for the dyeing and printing of natural and synthetic materials such as leather, cotton, cellulose, polyamides, and polyurethanes.

8 Claims, No Drawings

QUATERNARY AMMONIUM PHENYLAZO CATIONIC DYESTUFFS CONTAINING AN UNSATURABLE GROUP ON THE QUATERNARY NITROGEN

The subject of the invention are water-soluble azo dyestuffs which are free of sulphonic acid groups and carboxylic acid groups, of the general formula

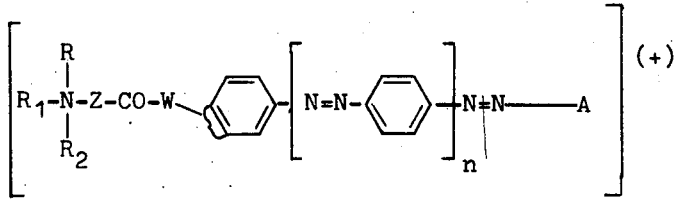

wherein
Z denotes an alkylene or aralkylene radical,
W denotes a direct bond or a bridge member,
R denotes an unsaturated alkyl radical which contains at least one double and/or triple bond,
$R_1$ denotes hydrogen, an alkyl radical or an unsaturated alkyl radical which contains at least one double or triple bond,
$R_2$ denotes hydrogen or an alkyl, amino, alkylamino or dialkylamino radical,
$R_1$ together with Z and the nitrogen atom denotes a heterocyclic structure,
$R_1$ together with $R_2$, Z and the nitrogen atom denotes a heterocyclic structure,
A denotes the radical of a carbocyclic or heterocyclic coupling component,
$n$ denotes the numbers 0 or 1 and $An^{(-)}$ denotes an anion, and aliphatic, carbocyclic and heterocyclic radicals can be substituted by non-ionic radicals.

A further subject of the invention are processes for the manufacture of the new dyestuffs, their use for dyeing and printing natural and synthetic materials, and the materials manufactured and printed therewith.

The preferred subject of the invention are dyestuffs which are free of groups which confer solubility in water, of the general formula

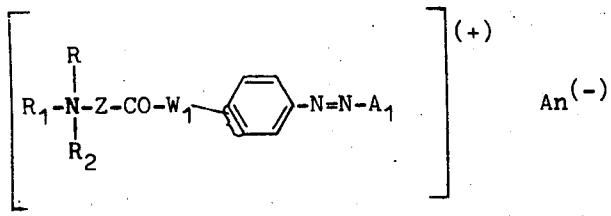

wherein
Z denotes an alkylene or aralkylene radical,
$W_1$ denotes a direct bond, a phenylene radical or the radicals

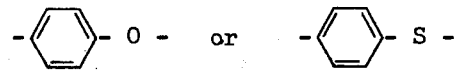

R denotes an unsaturated alkylene radical which contains at least one double and/or triple bond,
$R_1$ denotes hydrogen, an alkyl radical or an unsaturated alkyl radical which contains at least one double or triple bond,
$R_2$ denotes hydrogen or an alkyl, amino, alkylamino or dialkylamino radical,
$R_1$ together with Z and the nitrogen atom denotes a heterocyclic structure,
$R_1$ together with $R_2$, Z and the nitrogen atoms denotes a heterocyclic structure,
$A_1$ denotes the radical of a coupling component of the benzene, naphthalene, indole, pyrazolone, aminopyrazole, naphthaleneazobenzene or benzeneazobenzene series,
$An^{(-)}$ denotes an anion and aliphatic, carbocyclic and heterocyclic radicals can be substituted by non-ionic radicals. Particularly preferred dyestuffs amongst these are those of the general formula

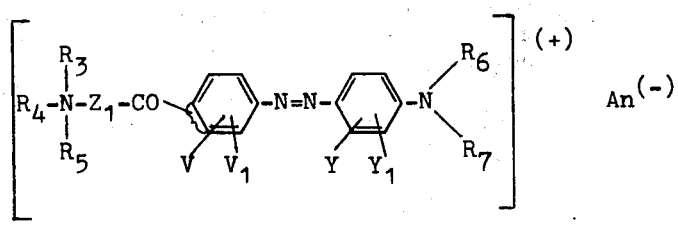

wherein
$Z_1$ denotes a lower alkylene or lower aralkylene radical,
$R_3$ denotes a lower alkyl radical which contains at least one double or triple bond,
$R_4$ denotes a lower alkyl radical or a lower alkyl radical which contains at least one double or triple bond,
$R_5$ denotes an alkyl, amino, lower alkylamino or lower dialkylamino radical,
$R_6$ denotes hydrogen, a lower alkyl or alkenyl group, a lower alkyl group which is substituted by hydroxyl, acetyl, acetoxy, lower alkoxy, lower alkoxycarbonyl or nitrile, or denotes phenyl or benzyl, $R_7$ denotes hydrogen, a lower alkyl or alkenyl group or a lower alkyl group substituted by hydroxyl, acetyl, acetoxy, lower alkoxy, lower alkoxycarbonyl or nitrile, V denotes hydrogen, a lower alkyl, lower alkoxy or alkylsulphonyl group, halogen, nitrile or nitro, $V_1$ denotes hydrogen, a lower alkyl group, halogen, nitrile or nitro, Y denotes hydrogen, a lower alkyl group, halogen or a lower alkoxy or acylamino group, $Y_1$ denotes hydrogen or a lower alkyl group and $An^{(-)}$ denotes an anion.

Preferred dyestuffs amongst these are those of the general formula

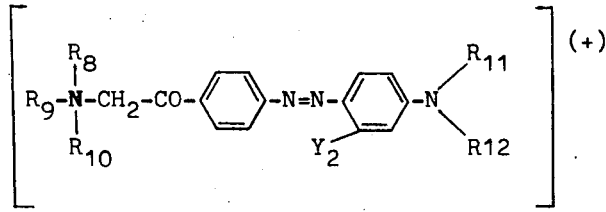

IV wherein $R_8$ denotes allyl, methallyl or propargyl,
$R_9$ denotes methyl or ethyl,
$R_{10}$ denotes methyl, ethyl or amino,
$R_{11}$ denotes methyl, ethyl or allyl,
$R_{12}$ denotes methyl, ethyl or allyl,
$Y_2$ denotes hydrogen or methyl and
$An^{(-)}$ denotes an anion.

In accordance with the definition, non-ionic subsituents can be present in the dyestuffs and compounds according to the invention. Examples of suitable substituents of this nature are: fluorine, chlorine and bromine; alkyl groups, especially straight-chain or branched lower alkyl radicals with 1-6 C atoms; aralkyl radical; alkenyl radicals; aryl radicals; alkoxy radicals, especially lower alkoxy radicals with 1-4 C atoms; aralkoxy radicals; aryloxy radicals, especially those wherein aryl represents a radical of the benzene series; alkylthio radicals, preferably lower alkylthio radicals with 1-3 C atoms; aralkylthio radicals; arylthio radicals, preferably phenylthio and its derivatives which are substituted in the phenyl nucleus; nitro; nitrile; alkoxycarbonyl, preferably those with a lower alkoxy radical with 1-4 C atoms; the formyl radical; alkylcarbonyl radicals, especially those with a lower alkyl group with 1-4 C atoms; arylcarbonyl, especially those wherein aryl represents a radical of the benzene series; aralkylcarbonyl, preferably with arylalkyl radicals whereof the aryl nucleus belongs to the benzene series; alkoxycarbonyloxy radicals, preferably with lower alkoxy radicals; alkylcarbonylamino radicals, preferably with a lower alkyl group with 1-4 C atoms, and arylcarbonylamino radicals, preferably those whereof the aryl radical belongs to the benzene series; alkylsulphonylamino radicals preferably with a lower alkyl group with 1-3 C atoms arylsulphonylamino groups, preferably those in which the aryl radical belongs to the benzene series; ureido N-aryl- or N-alkyl-ureido, aryl-oxycarbonylamido and alkyloxycarbonylamido; carbamoyl (carbonamide); N-alkyl-carbamoyl; N,N-dialkylcarbamoyl; N-alkyl-N-aryl-carbamoyl; sulphamoyl; N-alkylsulphamoyl $An^{(-)}$ N,N-dialkylsulphamoyl; alkylsulphonyl; aralkylsulphonyl, with 1-4 C atoms being preferably present in the alkyl radicals mentioned; arylsulphonyl, especially those wherein aryl represents a radical of the benzene series, carboxylic acid alkyl ester, carboxylic acid aryl ester, sulphonic acid alkyl ester and sulphonic acid aryl ester groups.

Suitable unsaturated alkyl radicals with at least one double and/or triple bond are, for example, the following compounds and their non-ionic substituted derivatives:

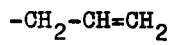
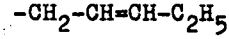
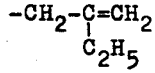
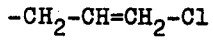

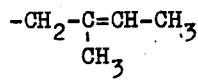
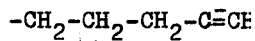
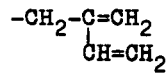
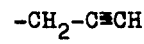
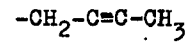
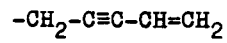
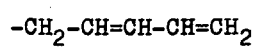
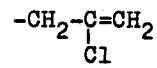

Possible anionic radicals $An^{(-)}$ are the organic and inorganic anions which are customary for cationic dyestuffs.

Inorganic anions are, for example, fluoride, chloride, bromide and iodide, perchlorate, hydroxyl, radicals of S-containing acids, such as hydrogen sulphate, sulphate, disulphate and aminosulphate; radicals of nitrogen-oxygen acids, such as nitrate; radicals of oxygen-acids of phosphorus, such as dihydrogen-phosphate, hydrogen-phosphate, phosphate and metaphosphate; radicals of carbonic acid such as bicarbonate and carbonate; further anions of oxygen-acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate, and tetrafluoborate, as well as anions of esters of boric acid, such as of the glycerine ester of boric acid, and of esters of phosphoric acid, such as of the methyl-phosphate.

Organic anions are, for example, anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, propionic acid, n-butyric acid, i-butyric acid, 2-methyl-butyric acid, 2-ethylbutyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, 0-ethylglycollic acid, thioglycollic acid, glyceric acid, malic acid, dodecyltetraethyleneglycol-ether-propionic acid, 3-(nonyloxy)-propionic acid, 3-(isotridecyloxy)-propionic acid, 3-(iso-tridecyloxy)-diethyleneglycol-ether-propionic acid, the ether-propionic acid of an alcohol mixture with 6 to 10 carbon atoms, thioacetic acid, 6-benzoylamino-2-chlorocaproic acid, nonylphenoltetraethyleneglycol-ether-propionic acid, nonylphenoldiethyleneglycol-ether-propionic acid, dodecyltetraethyleneglycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 of SHELL), a mixture of aliphatic carboxylic acids with 15 to 19 carbon atoms (Versatic Acid 1519 of SHELL), coconut fatty acid first runnings, undecanecarboxylic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azelaic acid, the isomer mixture of 2,2,4- and 2,2,4-trimethyladipic acid, sebacic acid, isosebacic acid (isomer mixture), tartaric acid, citric acid, glyoxylic acid, dimethyl-ether-α,α'-dicarboxylic acid, methylene-bis-thioglycollic acid, dimethylsulphide-α-α-dicarboxylic acid, 2,2'-dithio-di-n-propionic acid, fumaric acid, maleic acid, itaconic acid, ethylene-bis-iminoacetic acid, nitrolosulphonic acid, methanesulphonic acid, ethanesulphonic acid, chloromethanesulphonic acid, 2-chloroethanesulphonic acid and 2-hydroxyethanesulphonic acid and Mersolate, that is to say $C_8$–$C_{15}$ paraffinsulphonic acid obtained by chlorosulphonation of paraffin oil.

Suitable anions of cycloaliphatic carboxylic acids are, for example, the anions of cyclohexanecarboxylic acid and cyclohexene-3-carboxylic acid and anions of araliphatic monocarboxylic acids are, for example, anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitrobenzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 5-nitro-2-hydroxybenzoic acid, 3-nitro-2-hydroxybenzoic acid, 4-methoxybenzoic acid, 3-nitro-4-methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid, 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitroisophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and anthraquinone-2-carboxylic acid.

Suitable anions of heterocyclic carboxylic acids are, for example, the anions of pyromucic acid, dehydromucic acid and indolyl-(3)-acetic acid.

Suitable anions of aromatic sulphonic acids are, for example, the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-ω-sulphonic acid, 2-chlorotoluene-4-sulphonic acid, 1-hydroxybenzenesulphonic acid, n-dodecylbenzenesulphonic acid, 1,2,3,4-tetrahydronaphthalene-6-sulphonic acid, naphthalene-1-sulphonic acid, naphthalene-1,4-disulphonic acid or -1,5-disulphonic acid, naphthalene-1,3,5-trisulphonic acid, 1-naphthol-2-sulphonic acid, 5-nitroanaphthalene-2-sulphonic acid, stilbene-2,2'-disulphonic acid and biphenyl-2-sulphonic acid.

A suitable anion of heterocyclic sulphonic acids is, for example, the anion of quinoline-5-sulphonic acid.

Further possibilities are the anions of arylsulphinic, arylphosphonic and arylphosphonous acids, such as benzenesulphinic and benzenephosphonic acid.

Colourless or almost colourless anions are preferred. For dyeing from aqueous solution, those anions which do not excessively impair the solubility of the dyestuff in water are preferred. For dyeing from aqueous dispersion, this aspect is irrelevant in choosing the anions. For dyeing from organic solvents, those anions which promote the solubility of the dyestuff in organic solvents or at least do not affect it adversely are frequently also preferred; in particular, the anions of organic monocarboxylic and dicarboxylic acids with about 4 to 30 carbon atoms should here be mentioned.

The dyestuffs of the general formula I can be manufactured a. by diazotisation of an amine of the general formula

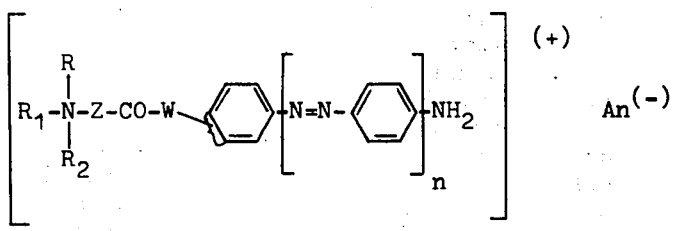

wherein
the radicals have the meaning indicated in the formula I, and subsequent coupling with a compound of the general formula

H — A

VI wherein
A has the meaning indicated in the formula I, b. by reaction of a dyestuff of the general formula

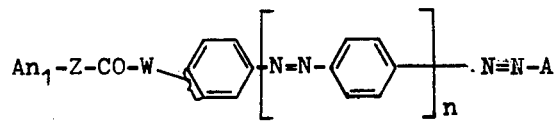

wherein
the symbols Z, W, A and n have the meaning indicated in the formula I and
$An_1$ denotes a radical which can be split off as an anion, especially halogen or an ester grouping,
with an amine of the general formula

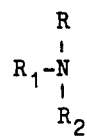   VIII wherein
the radicals R, $R_1$ and $R_2$ have the meaning indicated in the formula I, c. by reaction of an azo dyestuff of the general formula

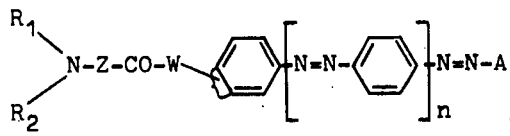   IX wherein
n, $R_1$, $R_2$, Z, W and A have the meaning indicated in the formula I,
with quaternising agents of the general formula R — $An_1$

X wherein
the radicals R and $An_1$ have the meaning indicated in the formulae I and VII respectively,
or by reaction of an azo dyestuff of the general formula

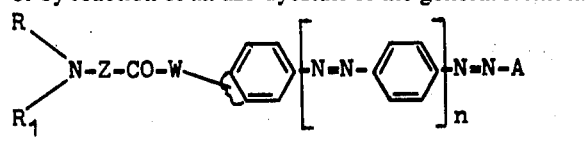

V wherein
n, R, $R_1$, Z, W and A have the meaning indicated in the formula I,
with quaternising agents of the general formula $R_2$ — $An_1$

XII wherein
the radicals $R_2$ and $An_1$ have the meaning indicated in the formulae I and VII respectively.

If other anions than those initially present during the manufacture and isolation of the new dyestuffs are desired, the anions $An^{(-)}$ or $An_1^{(-)}$ can be replaced in the usual manner by another anion $An^{(-)}$.

Suitable cations of the ammonium salts V are, for example:

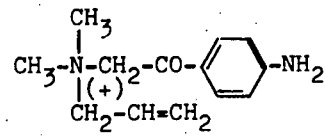

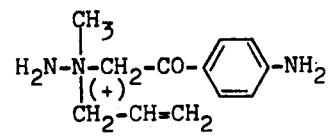

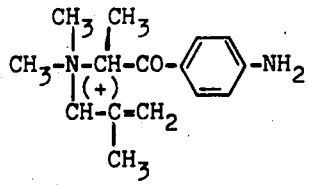

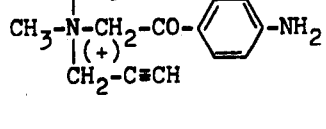

XI

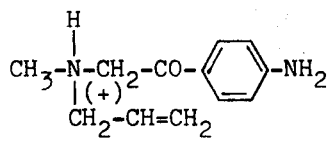

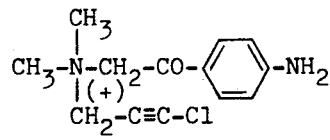

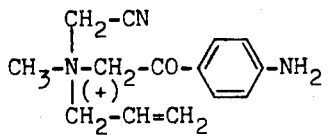

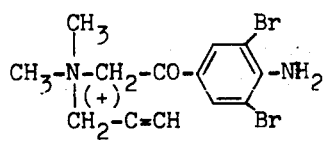

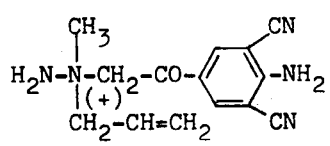

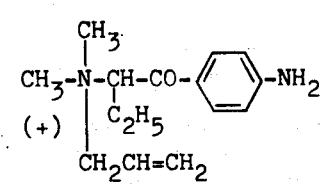

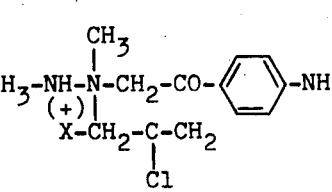

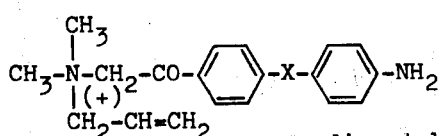

X= direct bond, O, S

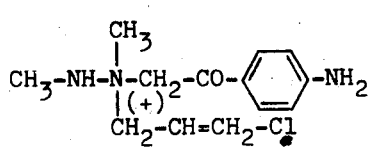

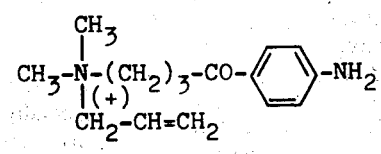

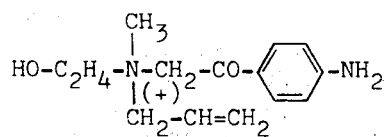

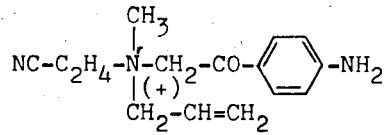

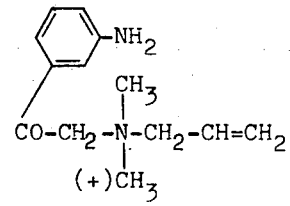

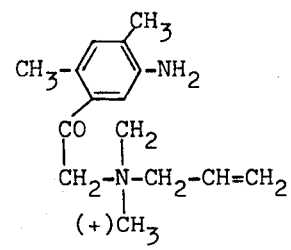

Suitable coupling components of the formula VI are, for example, phenols, such as cresol, aminobenzenes, aniline, 3-methylaniline, 2-methoxy-5-methylaniline, 3-acetylamino-1-aminobenzene, N-,ethylaniline, N-$\beta$-hydroxyethylaniline, N-$\beta$-methoxyethylaniline, N-$\beta$-cyanoethylaniline, N-$\beta$-chloroethylaniline, dimethylaniline, diethylaniline, N-methyl-N-benzylaniline, N-n-butyl-N-$\beta$-chloroethylaniline, N-methyl-N-$\beta$-cyanoethylaniline, N-methyl-N-$\beta$-hydroxyethylaniline, N-ethyl-N-$\beta$-chloroethylaniline, N-methyl-N-$\beta$-acetoxyethylaniline, N-ethyl-N-$\beta$-methoxyethylaniline, N-$\beta$-cyanoethyl-N-$\beta$-chloroethylaniline, N-cyanoethyl-N-acetoxyethylaniline, N,N-di-$\beta$-hydroxyethylaniline, N,N-di-$\beta$-acetoxyethylaniline, N-ethyl-N-$\beta$-hydroxyethyl-3-chloropropylaniline, N,N-di-$\beta$-cyanoethylaniline, N,N-di-$\beta$-cyanoethyl-3-methylaniline, N-$\beta'$-cyanoethyl-N-$\beta''$-hydroxyethyl-3-chloroaniline, N,N-di-$\beta$-cyanoethyl-3-methoxyaniline, N,N-dimethyl-3-acetylamino-aniline, N-ethyl-N-$\beta$-cyanoethyl-3-acetylamino-aniline, N,N-di-$\beta$-cyanoethyl-2-methoxy-5-acetylamino-aniline, N-methyl-N-phenacylaniline, N-$\beta$-cyanoethyl-2-chloroaniline, N,N-diethyl-3-trifluoromethylaniline, N-ethyl-N-phenylaniline, diphenylamine, N-methyldiphenylamine, N-methyl-4-ethoxydiphenylamine, N-ethyl-N-$\beta$-carbomethoxyethylaniline, N-ethyl-N-$\beta$-carboethoxyethyl-m-toluidine, N-phenylmorpholine, naphthols such as 1- or 2-naphthylamine as well as 2-phenylaminonaphthalene, 1-dimethylaminonaphthalene or 2-ethylaminonaphthalene, indoles such as 2-methylindole, 2,5-dimethylindole, 2,4-dimethyl-7-methoxyindole, 2-phenyl- or 2-methyl-5-ethoxyindole, 2-methyl-5- or -6-chloroindole, 1,2-dimethylindole, 1-methyl-2-phenylindole, 2-methyl-5-nitroindole, 2-methyl-5-cyanoindole, 2-methyl-7-chloroindole, 2-methyl-5-fluoro- or -5-bromoindole, 2-methyl-5,7-dichlorindole, 2-phenylindole, 1-cyanoethyl-2,6-dimethylindole, pyrazoles such as 1-phenyl-5-aminopyrazole, 3-methyl-5-pyrazolone, 1-phenyl-3-methyl-5-pyrazolone, 1,3-dimethyl-5-pyrazolone, 1-butyl-3-methyl-5-pyrazolone, 1-hydroxyethyl-3-methyl-5-pyrazolone, 1-cyanoethyl-3-methyl- 5-pyrazolone, 1-(o-chlorophenyl)-3-methyl-5-pyrazolone and 3-carboxymethoxy-5-pyrazolone.

Suitable compounds VII are, for example:

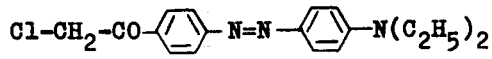

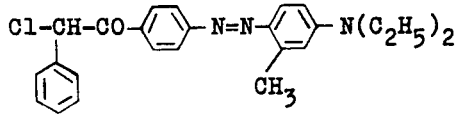

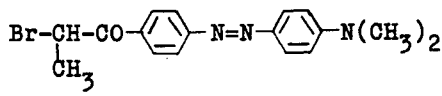

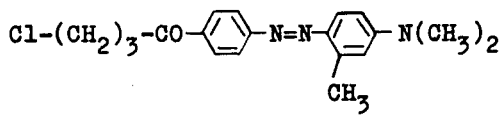

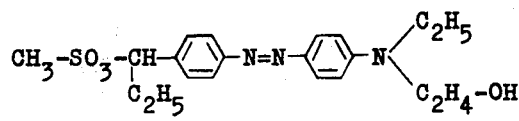

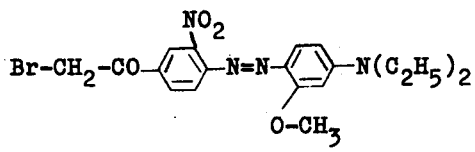

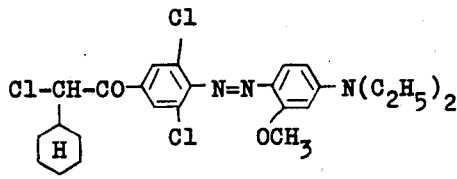

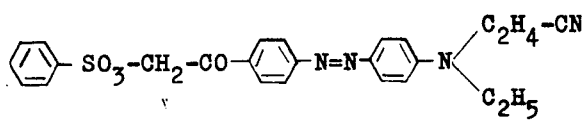

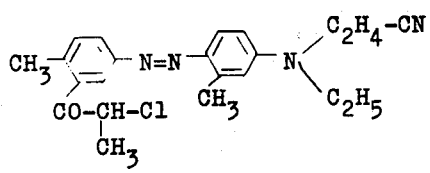

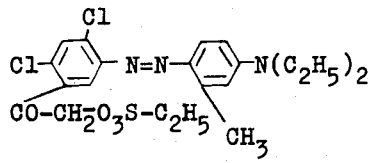

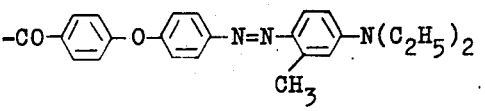

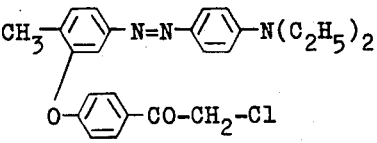

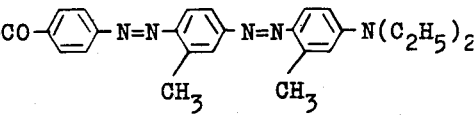

Suitable amines VIII are, for example: dimethylamine, diethylamine, N-methylethanolamine, dimethylallylamine, dimethylpropargylamine, cyanomethylmethyl-allylamine, N-methyl-allylamine, N-methyl-metallylamine, N-methylhydrazine, N-methyl-N-allylhydrazine and N,N'-dimethylhydrazine.

Suitable quaternising agents of the formula X are, for example: allyl chloride, allyl bromide, methallyl chloride, 2-chloroallyl chloride, 3-chloroallyl chloride, buten-(2)-yl chloride, penten-(2)-yl chloride, ethylallyl chloride, 2-methylbuten-(2)-yl chloride, propargyl chloride, butin-(2)-yl chloride, butin-(3)-yl chloride, n-pentin-(4)-yl chloride, 2-vinyl-allyl chloride and pentadien-(2,4)-yl chloride.

Suitable quaternising agents of the formula XII are, for example: methyl chloride, methyl bromide, methyl iodide, dimethyl sulphate, ethyl sulphate, ethyl chloride, ethyl iodide, ethyl bromide, n-propyl bromide, n-butyl bromide, allyl chloride, methallyl chloride, β-chloroethyl-β-ethoxyethyl-ether, 2-chlorodiethyl-ether, 2-bromodiethyl-ether, ethyl sulphate, 2-propyl sulphate, chloroacetic acid and bromoacetic acid methyl ester, chloroacetic and bromoacetic acid ethyl ester, methyl p-toluenesulphonate, ethyl p-toluenesulphonate, n-propyl p-toluenesulphonate, ethylene chlorohydrin, γ-chloropropionic acid methyl ester, 2-chloroacetonitrile, acetic acid β-chloroethyl ester and also hydrochloric acid, sulphuric acid, methylsulphonic acid, phosphoric acid, formic acid, acetic acid, propionic acid, chloramine, N,N-dimethylchloramine and hydroxylamine-O-sulphonic acid.

Suitable materials for dyeing with the new dyestuffs are, in particular, materials of polyacrylonitrile or of copolymers, containing at least 85% of acrylonitrile, of acrylonitrile with other vinyl compounds, such as vinyl chloride, vinylidene chloride, vinyl fluoride, vinyl acetate, vinylpyridine, vinylimidazole, vinyl alcohol, acrylic and methacrylic acid esters and amides and asymmetrical dicyanoethylene. Equally, materials of acid-modified synthetic materials, especially of acid-modified aromatic polyesters as well as acid-modified polyamide fibres, can be dyed excellently. Acid-modified aromatic polyesters are, for example, polycondensation products of sulphoterephthalic acid and ethylene glycol, that is to say polyethylene glycol terephthalates containing sulphonic acid groups (of the type of DACRON 64 E. I. DuPont de Nemours and Company), such as are described in Belgian Pat. Specification No. 549,179 and U.S. Pat. No. 2,893,816.

Dyeing can be carried out from a weakly acid liquor, with the goods appropriately being introduced into the dye bath at 40° to 60°C and then being dyed at the boil. It is also possible to dye under pressure at temperatures above 100°C. Furthermore, the dyestuffs can be added to spinning solutions for the manufacture of fibres containing polyacrylonitrile or be applied to the unstretched fibres.

The new dyestuffs furthermore serve for dyeing and printing other textile and non-textile materials, for example those of leather, tannin-treated cotton, cellulose, synthetic polyamides and polyurethanes, and for dyeing fibres containing lignin, such as coir, jute and sisal. They are furthermore suitable for the manufacture of writing fluids, rubber stamp inks and ball pen pastes and can also be used in flexographic printing.

As a result of their surprisingly good solubility in water and organic solvents, the dyestuffs according to the invention are particularly suitable for use in liquid compositions and for dyeing from concentrated liquors. On materials of polyacrylonitrile or acid-modified fibres they are distinguished by very good fastness to light, wet processing, rubbing and sublimation, by a high affinity for the fibre and by a low tendency to give undesirable precipitates with extraneous ions, such as the thiocyanate ion.

The parts indicated in the examples are parts by weight.

EXAMPLE 1

25.5 parts of 1-aminobenzene-4-acetyl-dimethyl-allyl-ammonium chloride are dissolved in dilute hydrochloric acid, the solution is cooled to 0°–5°C and the substance is diazotised by dropwise addition of an aqueous solution of 7 g of sodium nitrite. After approx. 30 minutes, a slight excess of nitrite which may still be present is removed by adding a little sulphamic acid, an aqueous solution, containing hydrochloric acid, of 16.3 parts of diethyl-m-toluidine is added and concentrated sodium hydroxide solution is slowly added dropwise, with good stirring, until a pH of 5 to 6 is reached. If the sodium hydroxide solution is added too rapidly, the dyestuff is obtained in a somewhat sticky form, but on further stirring changes into the crystalline form. The dyestuff is thoroughly drained by filtration and forms a red-brown powder which dyes polyacrylonitrile fibres in red shades.

The solubility of this dyestuff in water is about 20 times that of the analogous trimethylammonium dyestuff. Equally, the solubility in organic solvents or solvent mixtures is substantially increased.

EXAMPLE 2

30 parts of 1-acetylamino-4-acetyl-dimethyl-allyl-ammonium chloride are boiled in approx. 10% strength aqueous hydrochloric acid for ½ hour and from there onwards the procedures of Example 1 is followed. In this way, the same dyestuff is obtained.

EXAMPLE 3

21.4 parts of 1-acetylamino-4-chloroacetyl-benzene are stirred for 24 hours at room temperature with aqueous approx. 50% strength dimethylamine solution, the excess dimethylamine is removed in vacuo and 8 parts of allyl chloride are added dropwise at 70° to 90°C whilst stirring. If from here onwards the procedure of Example 2 is followed, the same dyestuff is obtained. Analogous dyestuffs are obtained on using 8 parts of propargyl chloride or 11 parts methallyl chloride.

The dyestuffs mentioned in the table, which dye polyacrylonitrile in the colour shades indicated, can be manufactured in accordance with the method of Example 1. If different anions than those present as a result of the manufacturing process are desired, the anions can be replaced in a known manner. On dyeing, the dyestuffs give the same shades on polyacrylonitrile.

| Dyestuff | Colour shade on polyacrylonitrile |
|---|---|
| $CH_3-\underset{(+)}{\overset{CH_3}{\underset{CH_2-CH=CH_2}{N}}}-CH_2-CO-\underset{CH_3}{\underset{Cl}{\overset{Cl}{C_6H_2}}}-N=N-\underset{CH_3}{C_6H_3}-N(C_2H_4-O-CO-CH_3)_2 \quad Cl^{(-)}$ | yellow-brown |
| $CH_3-\underset{(+)}{\overset{CH_3}{\underset{CH_2-\underset{CH_3}{C}=CH_2}{N}}}-CH_2-CO-\underset{CH_3}{C_6H_3}-N=N-\underset{CH_3}{C_6H_3}-N(C_2H_5)_2 \quad Cl^{(-)}$ | red |
| $CH_3-\underset{(+)}{\overset{CH_3}{\underset{CH_2-CH=CH_2}{N}}}-CH_2-CO-\underset{CH_3}{\overset{CH_3}{C_6H_3}}-N=N-\underset{CH_3}{C_6H_3}-N(C_2H_5)_2 \quad Cl^{(-)}$ | red |
| $CH_3-\underset{(+)}{\overset{CH_3}{\underset{CH_2-CH=CH_2}{N}}}-CH_2-CO-C_6H_4-N=N-\underset{CH_3}{C_6H_3}-\underset{C_2H_4-C_6H_5}{\overset{C_2H_5}{N}} \quad Cl^{(-)}$ | red |

| Dyestuff | Colour shade on polyacrylonitrile |
|---|---|
| 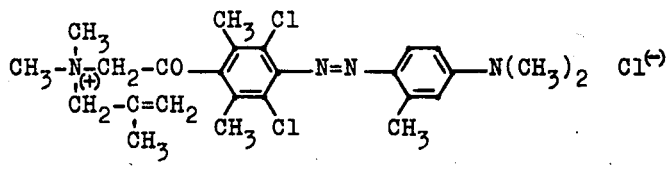 | yellow-brown |
| 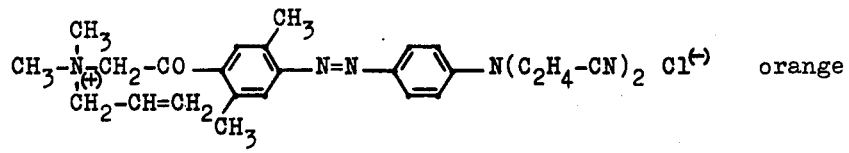 | orange |
| 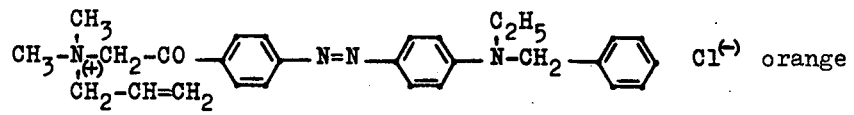 | orange |
| 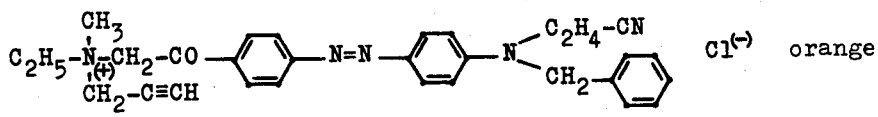 | orange |
| 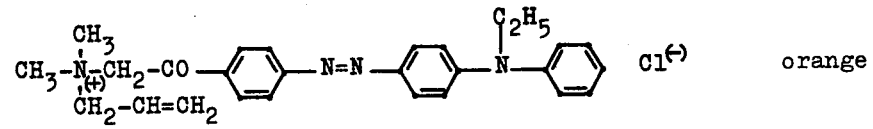 | orange |
| 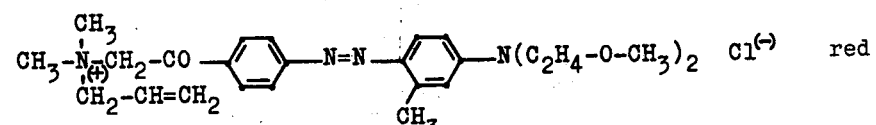 | red |
| 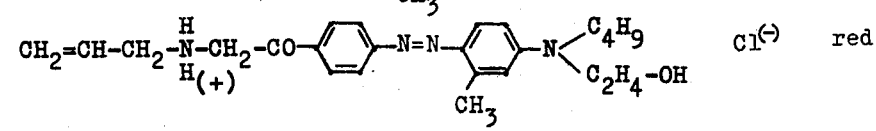 | red |
| 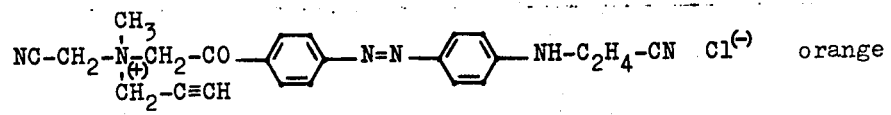 | orange |
| 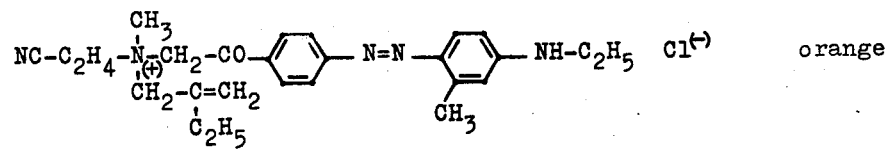 | orange |
| 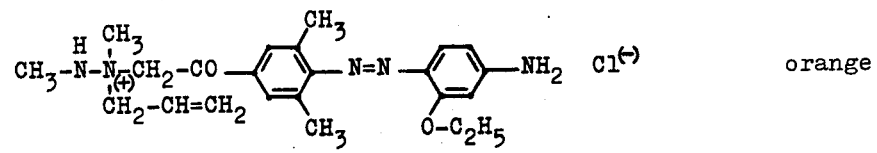 | orange |
| 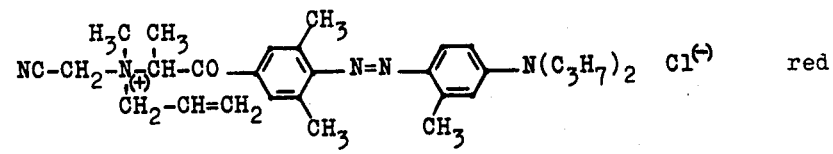 | red |
| 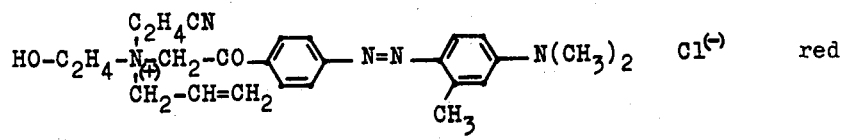 | red |

| Dyestuff | Colour shade on polyacrylonitrile |
|---|---|
| 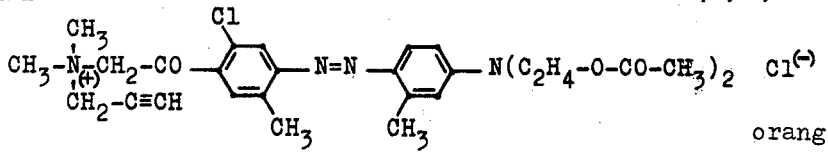 | orange |
| 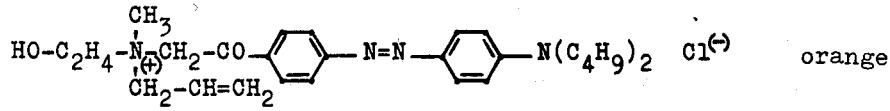 | orange |
| 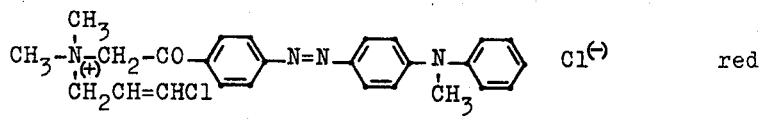 | red |
| 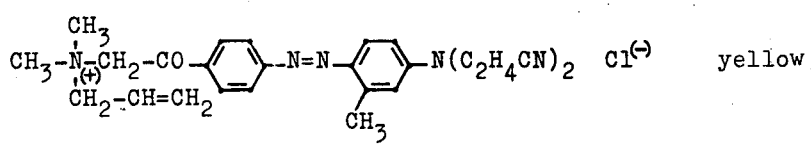 | yellow |
| 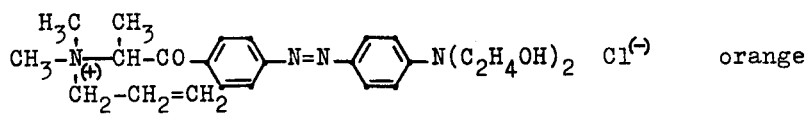 | orange |
| 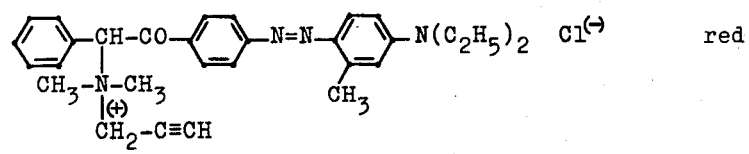 | red |
| 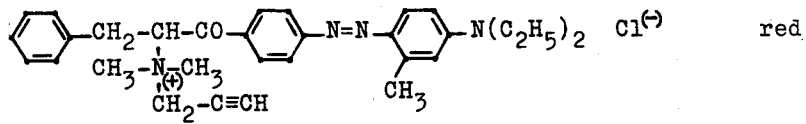 | red |
| 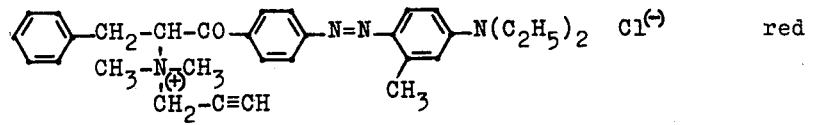 | red |
| 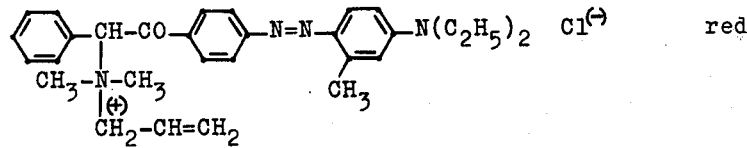 | red |
| 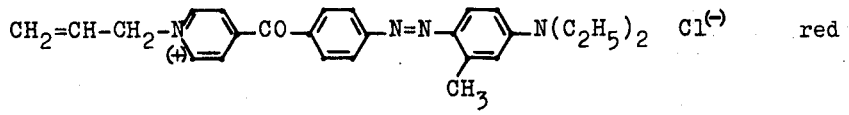 | red |
| 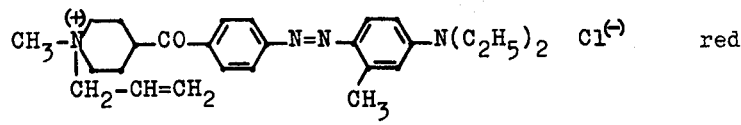 | red |

—Continued
| Dyestuff | Colour shade on polyacrylonitrile |
|---|---|
| 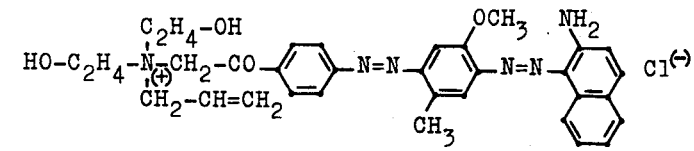 | violet |
| 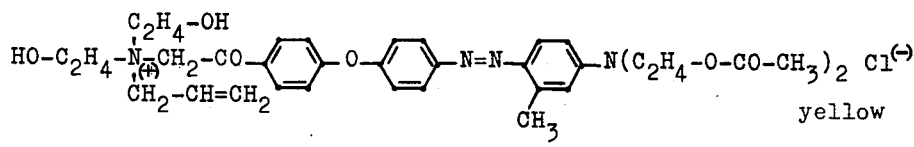 | yellow |
| 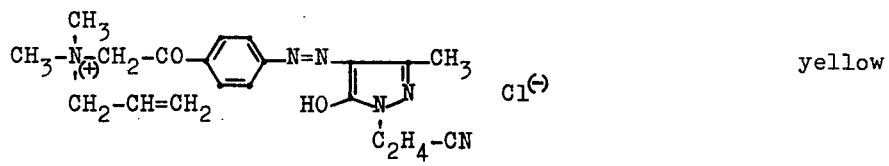 | yellow |
| 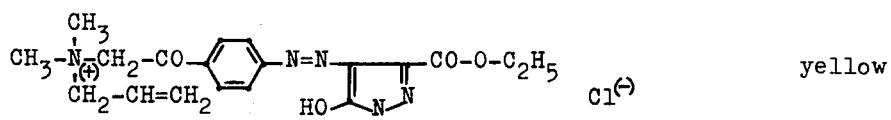 | yellow |
| 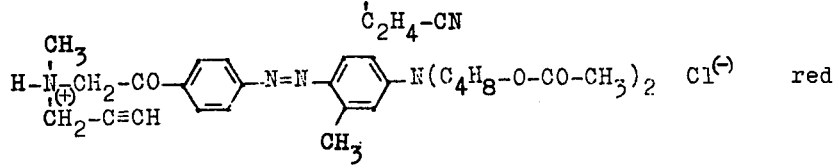 | red |
| 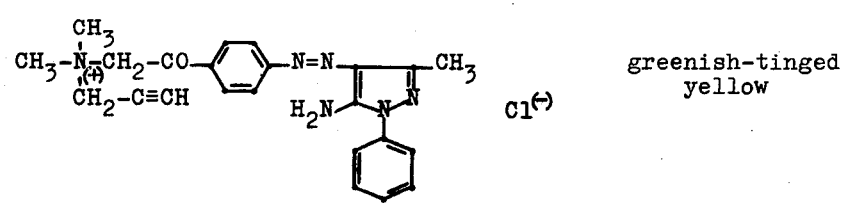 | greenish-tinged yellow |
| 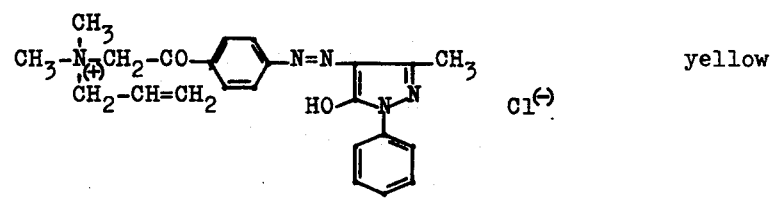 | yellow |
| 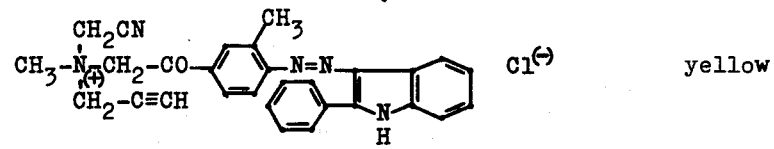 | yellow |
| 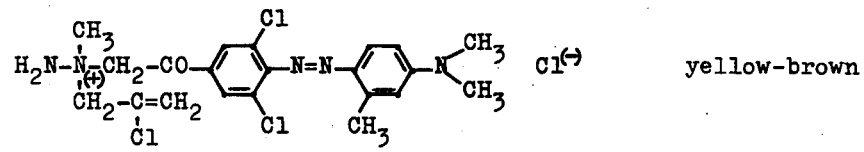 | yellow-brown |
| 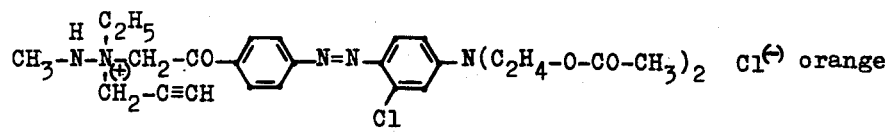 | orange |

—Continued
| Dyestuff | Colour shade on polyacrylonitrile |
|---|---|
| 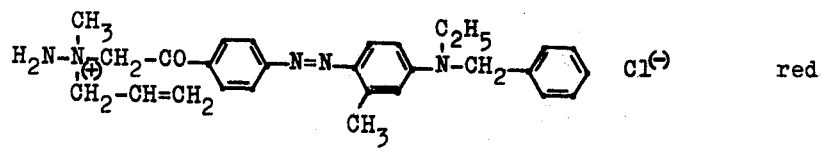 | red |
| 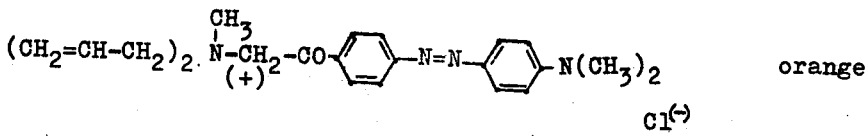 | orange |
| 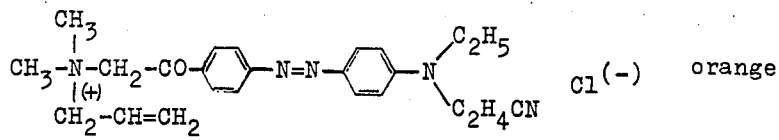 | orange |
| 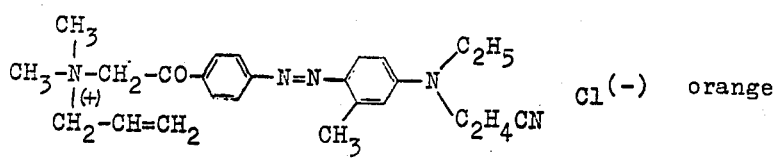 | orange |
| 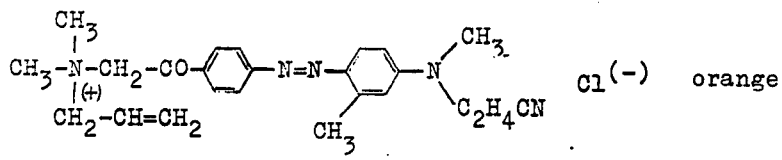 | orange |
| 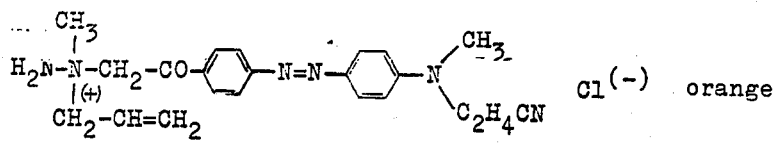 | orange |
| 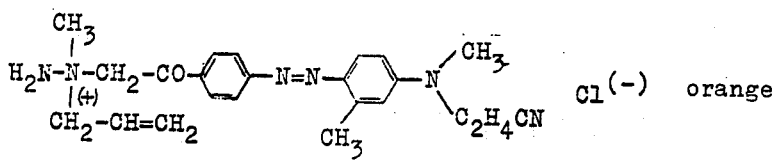 | orange |
| 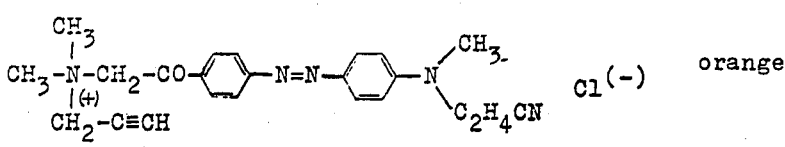 | orange |
| 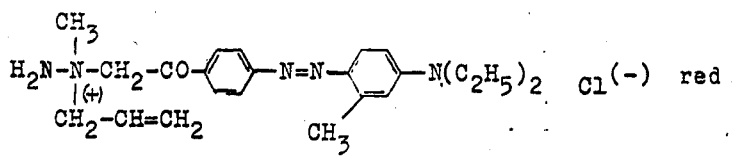 | red |
| 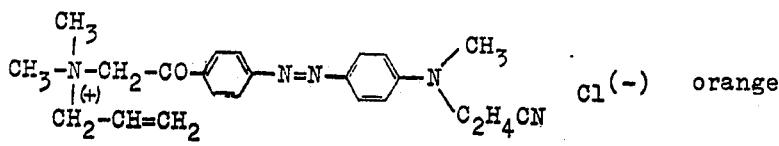 | orange |

—Continued
| Dyestuff | Colour shade on polyacrylonitrile |
|---|---|
| 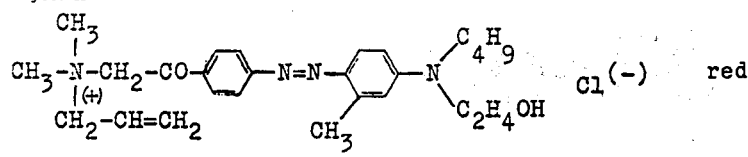 | red |
| 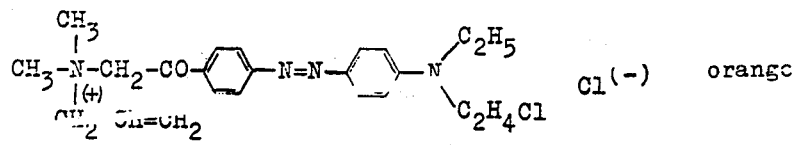 | orange |
| 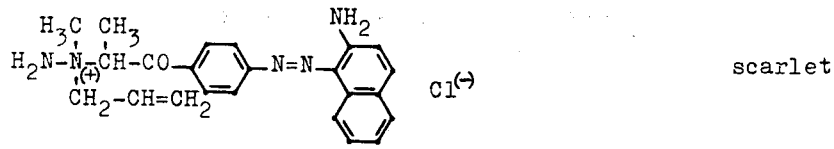 | scarlet |
| 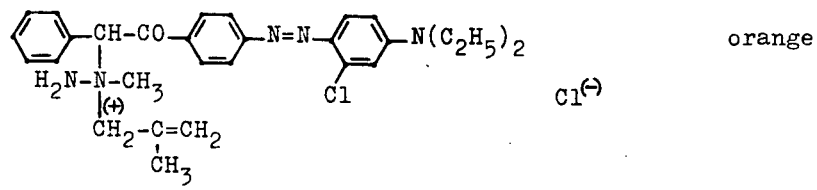 | orange |
| 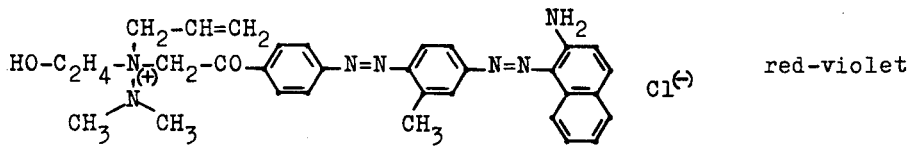 | red-violet |
| 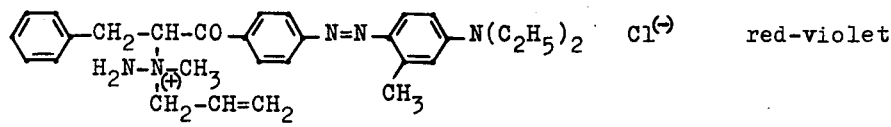 | red-violet |
| 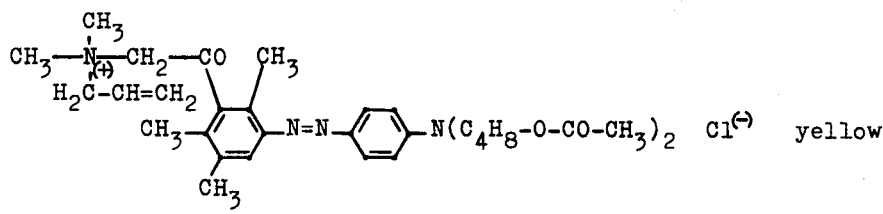 | yellow |
| 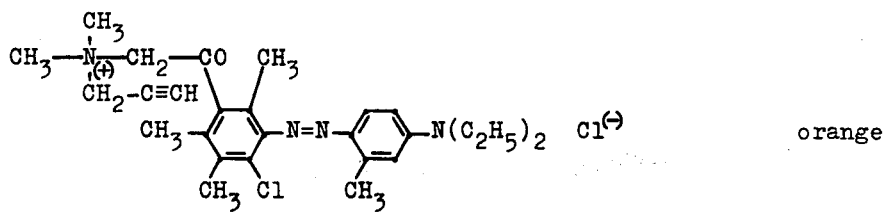 | orange |
| 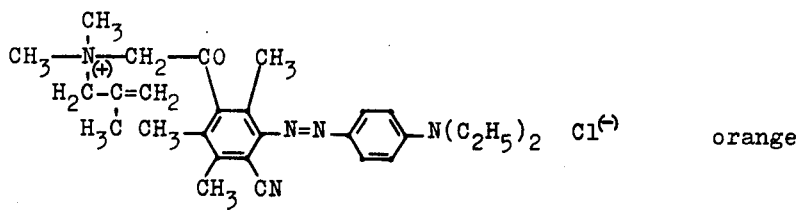 | orange |

—Continued
| Dyestuff | Colour shade on polyacrylonitrile |
|---|---|
| 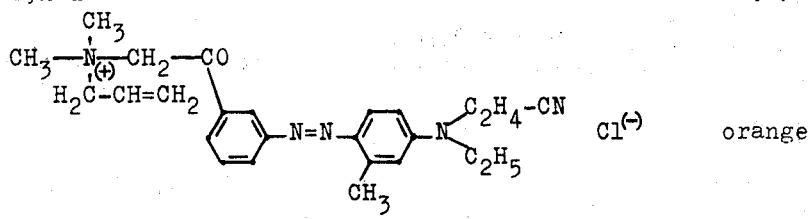 | orange |
| 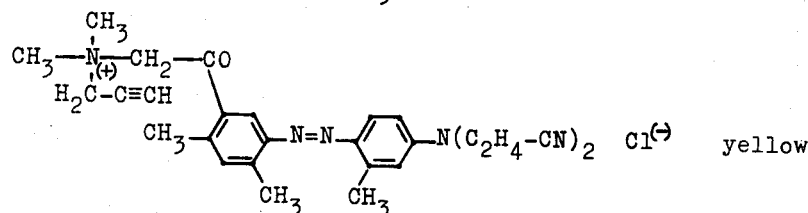 | yellow |
| 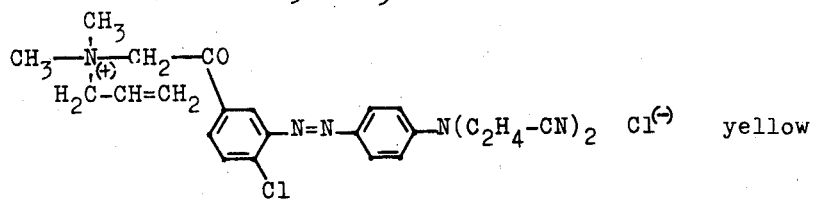 | yellow |
| 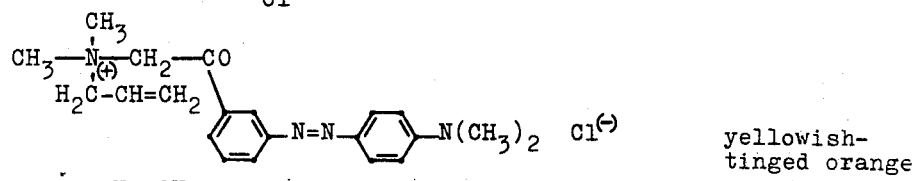 | yellowish-tinged orange |
| 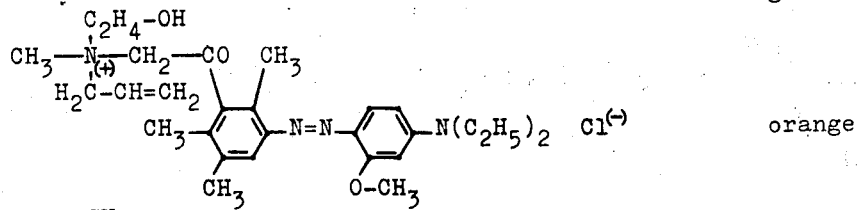 | orange |
| 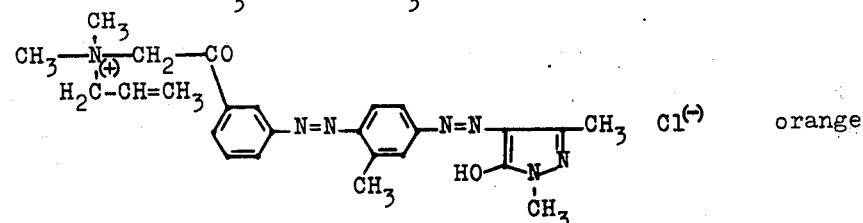 | orange |
| 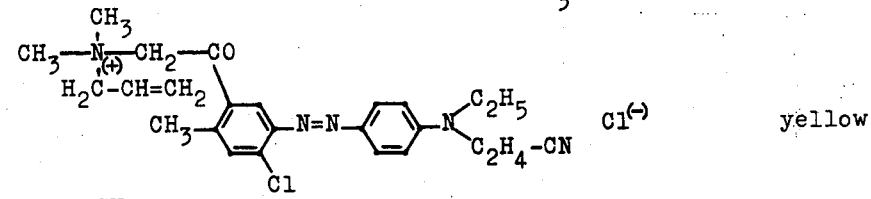 | yellow |
| 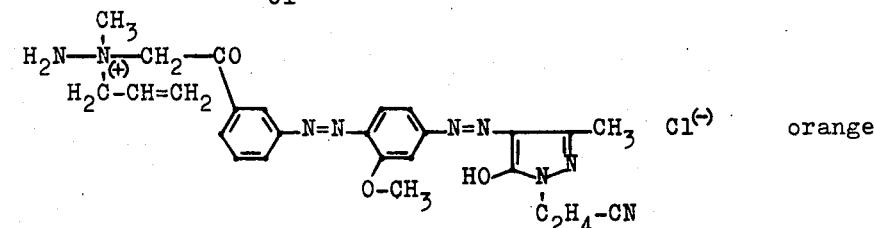 | orange |
| 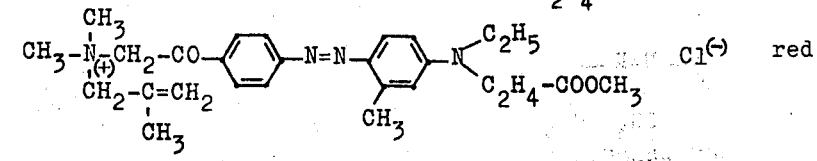 | red |

EXAMPLE 4

21.4 parts of 1-acetylamino-4-chloroacetyl-benzene in approx. 10% strength aqueous hydrochloric acid are boiled for ½ hour. The resulting solution is treated dropwise with 7 parts of NaNO₂ in aqueous solution at 0° to 5°C, after 30 minutes a small amount of sulphamic acid is added, and a solution of diethyl-amino-3-methoxy-benzene, containing hydrochloric acid, is then added dropwise. The mixture is then buffered to pH 5 with solid sodium acetate and the dyestuff which has precipitated is filtered off and washed until free of salt.

The paste thus obtained is suspended in a little water to give a slurry which can be stirred, and 11 parts of di-methyl-allylamine are added at 80° to 100°C until the entire dyestuff has dissolved. After cooling and salting-out, the dyestuff produced separates out. If dyes polyacrylic fibres in red shades and is very easily soluble in water.

EXAMPLE 5

If the same procedure as in Example 4 is followed, using 60 parts of N-methyl-N-allylhydrazine, the analogous dyestuff is obtained.

EXAMPLE 6 a. 21.4 parts of 1-acetylamino-4-chloroacetyl-benzene and approx. 50 parts of methyl-allylamine are warmed to 60° – 70°C, 4 parts of NaOH in water are then added and the excess amine is distilled off. The product which has precipitated is filtered off and washed. The product, whilst still moist, is boiled for ½ hour with 10% strength hydrochloric acid and diazotised as in Example 1, and this product is coupled with 13 parts of dimethylaniline. After completion of coupling, the mixture is rendered strongly alkaline and the product is washed with water until free of salt and dried. The resulting dyestuff dyes polyacrylic fibres from a weakly acid bath in orange shades.

b. 33.9 parts of this dyestuff are dissolved in dilute acetic acid at room temperature, thereafter 13 parts of dimethyl sulphate are added dropwise whilst stirring and the mixture is warmed to approx. 20°–50°C for ½ hour. After cooling and salting-out, an easily soluble dyestuff is obtained, which dyes polyacrylic fibres in orange shades.

c. On using an aqueous suspension of the dyestuff base manufactured according to Example 6(a) with aqueous chloramine solution at 50°C, or a benzene solution into which gaseous chloramine is passed, an analogous very easily water-soluble dyestuff is obtained, which dyes polyacrylic fibres in the same colour shade.

The following dyestuffs can be manufactured in accordance with the method of Example 6(b) or 6(c):

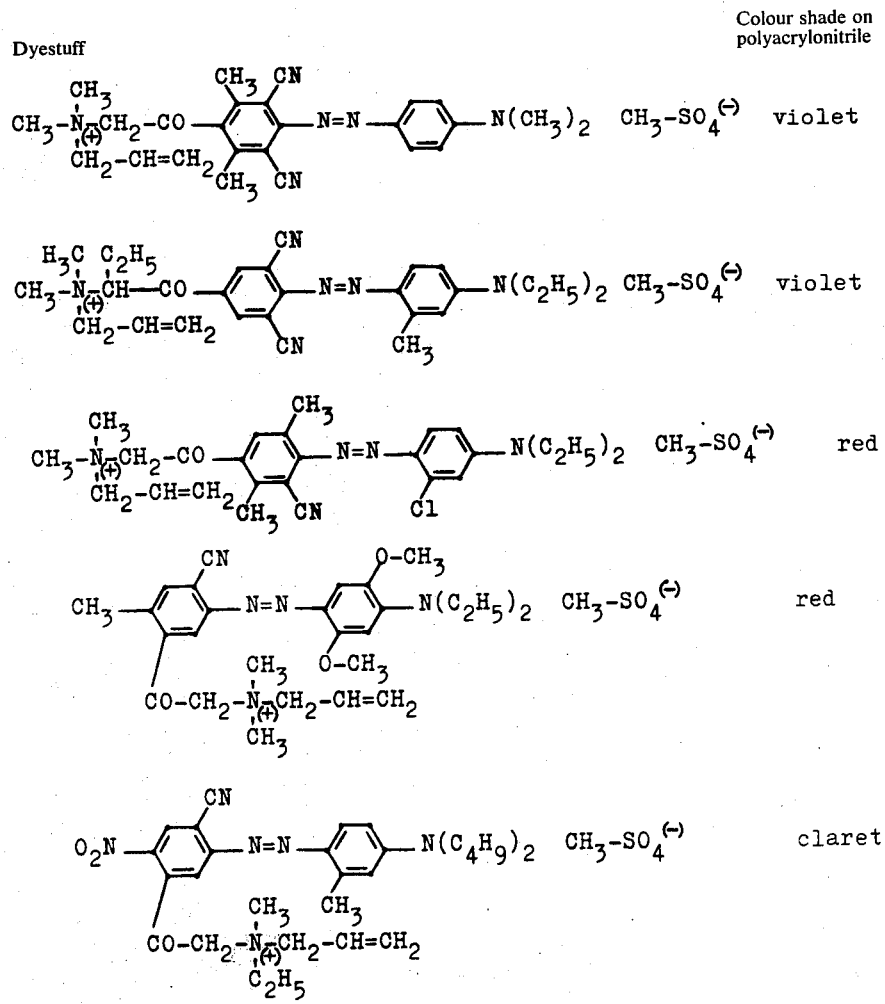

| Dyestuff | Colour shade on polyacrylonitrile |
|---|---|
| 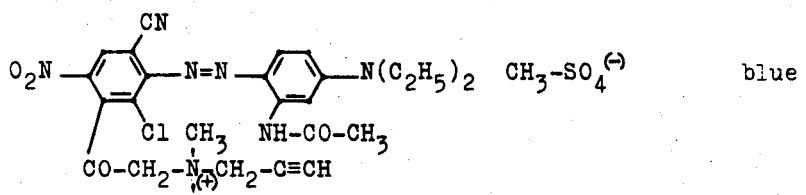 | blue |
| 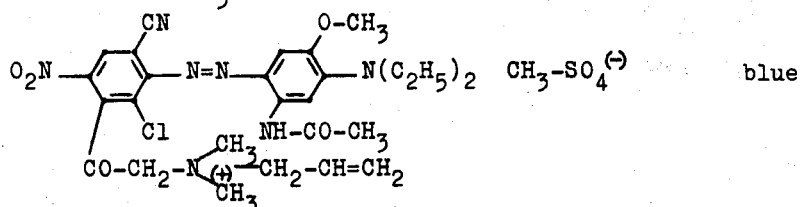 | blue |
| 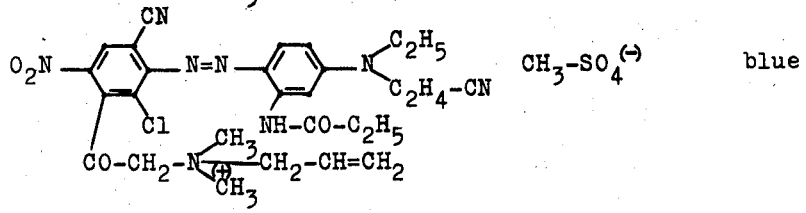 | blue |
| 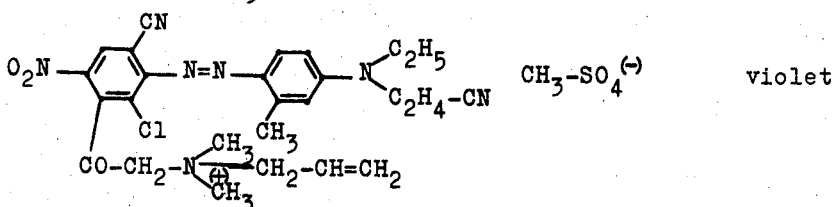 | violet |
| 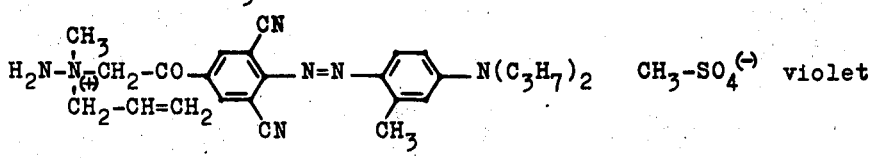 | violet |
| 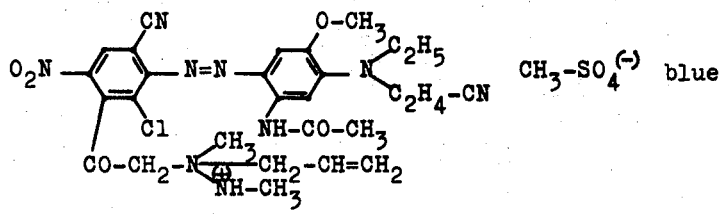 | blue |
| 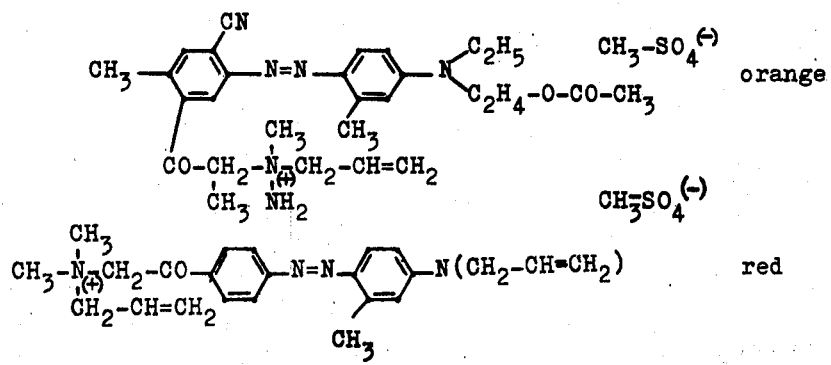 | orange / red |

EXAMPLE 7

100 g of polyacrylonitrile piece goods are treated with the following dyeing liquor:

0.6 g of the dyestuff manufactured in Example 1 are worked into a paste with hot water and this paste is dissolved in 500 ml of hot water. 0.5 g of the reaction product of 50 g of ethylene oxide with 1 mol of oleyl alcohol, and 12.5 g of sodium sulphate, are added to the dyeing liquor. Thereafter the liquor is adjusted to pH 4.5 with acetic acid and 1 g of sodium acetate is further added. The fabric is dyed at 100°C, and a red shade is obtained.

EXAMPLE 8

0.07 g of the dyestuff manufactured in Example 1 are worked into a paste with the 20-fold amount of hot water, with addition of a little acetic acid, in a dyeing beaker of 500 ml capacity located in a waterbath which can be heated, and the paste is dissolved in hot water. 0.5 g of the reaction product of 50 mols of ethylene oxide with 1 mol of oleyl alcohol and 1.5 g of a customary aromatic o-hydroxycarboxylic acid methyl ether are further added to the dyeing liquor. The liquor is made up to 500 ml with cold water. The pH value of the dyeing liquor is then adjusted to 4.5–5 with acetic acid or sodium acetate. 10 g of piece goods of acid-modified polyesters are constantly agitated in this dyeing liquor whilst raising the temperature to 100°C over the course of 15 minutes. The material is then rinsed with cold water and subsequently dried, for example by ironing or in a drying cabinet at 60° to 70°C. A red shade is finally obtained.

EXAMPLE 9

0.055 g of the dyestuff manufactured in Example 1 are worked into a paste with the 20-fold amount of hot water, with the addition of a little acetic acid, in a dyeing beaker of 500 ml capacity located in a waterbath which can be heated, and the paste is dissolved in hot water. 0.5 g of the reaction product of 50 mols of ethylene oxide with 1 mol of oleyl alcohol are further added to the dyeing liquor, and the liquor is made up to 500 ml with cold water. The pH value of the dyeing liquor is adjusted to 4.5 to 5 with acetic acid or sodium acetate. 10 g of piece goods of acid-modified polyamide are constantly agitated in this dyeing liquor whilst raising the temperature to 100°C over the course of 15 minutes. The material is then rinsed with cold water and subsequently dried, for example by ironing or in a drying cabinet at 60° to 70°C. The colour shade is red.

EXAMPLE 10

East India sheep skin, prepared for dyeing in the usual manner, is dyed for 45 minutes at 40°C in a drum tumbler, using a liquor ratio of 1:10, by means of 1% of the dyestuff as described in Example 4, which has beforehand been worked into a paste with an equal amount of 30% strength acetic acid. The leather is finished in the known manner. A red dyeing having good fastness properties is obtained.

EXAMPLE 11

100 g of polyacrylonitrile piece goods are treated with the following dyeing liquor:

0.6 g of the dyestuff manufactured in Example 4 are worked into a paste with hot water and dissolved in 500 ml of hot water. 0.5 g of the reaction product of 50 g of ethylene oxide with 1 mol of oleyl alcohol and 12.5 g of sodium sulphate are added to the dyeing liquor. The liquor is then adjusted to pH 4.5 with acetic acid and 1 g of sodium acetate is also added. The fabric is dyed at 100°C, and a red shade is obtained.

I claim:

1. Azo dyestuff of the formula:

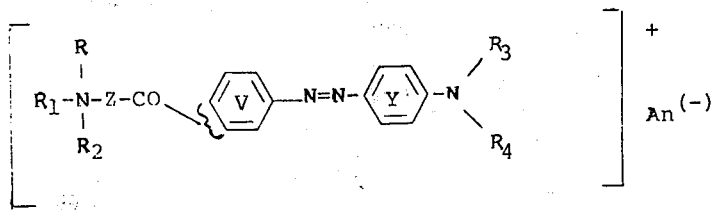

wherein

R is allyl, methylallyl ethylallyl, 2-chloroallyl, 3-chloroallyl or propargyl;

$R_1$ is hydrogen, methyl, ethyl, cyanoethyl, hydroxyethyl or allyl;

$R_2$ is hydrogen, methyl, ethyl, cyanomethyl, cyanoethyl, hydroxyethyl, amino, methylamino or dimethylamino;

Z is methylene, methylmethylene, ethylmethylene, phenylmethylene, benzylmethylene, or cyclohexylmethylene;

$R_3$ and $R_4$, independently of each other are hydrogen, allyl, phenyl, alkyl of 1–4 carbon atoms, or alkyl of 1–4 carbon atoms substituted by chloro, cyano, hydroxy, phenyl, methoxy, methoxycarbonyl, ethoxycarbonyl, or methylcarbonyloxy;

V is unsubstituted or contains 1–4 substituents selected from the group consisting of methyl, chloro, cyano, methoxy, and nitro;

Y is unsubstituted or contains 1–2 substituents selected from the group consisting of methyl, trifluoromethyl, chloro, methoxy, acetylamino and propionylamino; and $An^{(-)}$ is an anion.

2. Azo dyestuff of the formula:

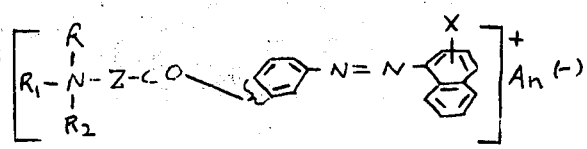

wherein

X is ortho to the azo group and is amino, ethylamino, or phenylamino, or X is para to the azo group and is dimethylamino;

R is allyl, methylallyl ethylallyl, 2-chloroallyl, 3-chloroallyl or propargyl;

$R_1$ is hydrogen, methyl, ethyl, cyanoethyl, hydroxyethyl or allyl;

$R_2$ is hydrogen, methyl, ethyl, cyanoethyl, cyanomethyl, hydroxyethyl, amino, methylamino or dimethylamino;

Z is methylene, methylmethylene, ethylmethylene, phenylmethylene, benzylmethylene or cyclohexylmethylene;

$An^{(-)}$ is an anion.

3. Azo dyestuff of the formula

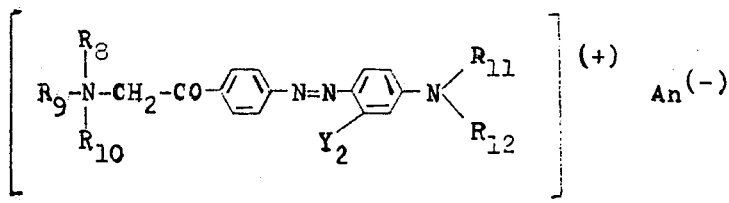

wherein
- $R_8$ denotes allyl, methallyl or propargyl,
- $R_9$ denotes methyl or ethyl,
- $R_{10}$ denotes methyl, ethyl or amino,
- $R_{11}$ denotes methyl, ethyl or allyl,
- $R_{12}$ denotes methyl, ethyl or allyl,
- $Y_2$ denotes hydrogen or methyl and
- $An^{(-)}$ denotes an anion.

4. Azo dyestuff of the formula

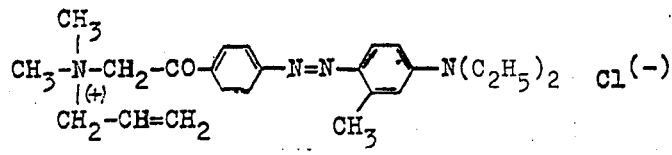

5. Azo dyestuff of the formula

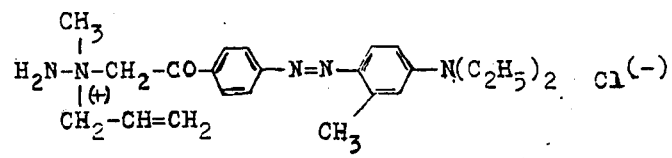

6. Azo dyestuff of the formula

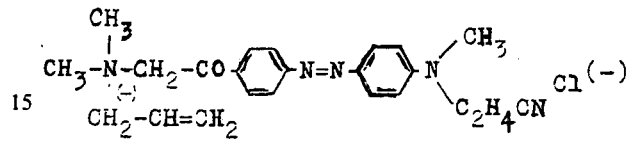

7. Azo dyestuff of the formula

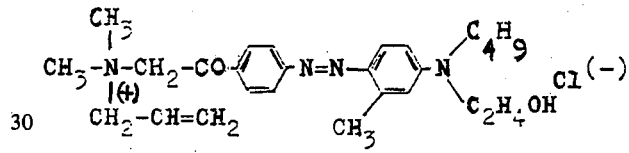

8. Azo dyestuff of the formula

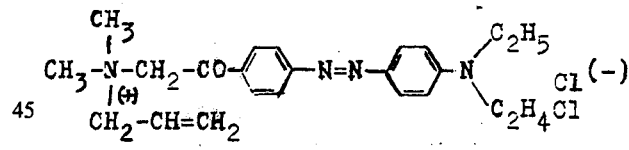

* * * * *

UNITED STATES PATENT AND TRADEMARK OFFICE
CERTIFICATE OF CORRECTION

PATENT NO. : 3,876,627

DATED : April 8, 1975

INVENTOR(S) : Winfried Kruckenberg

It is certified that error appears in the above-identified patent and that said Letters Patent are hereby corrected as shown below:

Column 5, line 42, after and, 2,2,4- second occurrence should be ---2,4,4- ---.

Column 4, line 4, "alky" should be ---alkyl---.

Columns 13 and 14, at the bottom of page, first and second formulaes should be switched. Formula 1 should be Formula 2 and Formula 2 should be Formula 1.

Column 13, line 6, after "64" insert ---of---.

Column 27, line 9, "pH" should be ---$p_H$---.

Column 27, line 18, "If" should be ---It---.

Columns 29 and 30, at the bottom, Column 30, third line from bottom, "pH" should be ---$p_H$---.

Column 31, line 20, "pH" should be ---$p_H$---.

Column 31, line 40, "pH" should be ---$p_H$---.

Column 31, line 68, "pH" should be ---$p_H$---.

Column 32, Claim 2, the formula has been done by hand.

Signed and Sealed this

Sixth Day of July 1976

[SEAL]

Attest:

RUTH C. MASON
*Attesting Officer*

C. MARSHALL DANN
*Commissioner of Patents and Trademarks*